Oct. 14, 1969 E. G. SEACY ET AL 3,473,007
AIRCRAFT NAVIGATIONAL EQUIPMENT
Filed March 16, 1966 2 Sheets-Sheet 1

Inventors
E. G. SEACY
F. B. WHITEHALL
By Cameron, Kerkam & Sutton
Attorneys

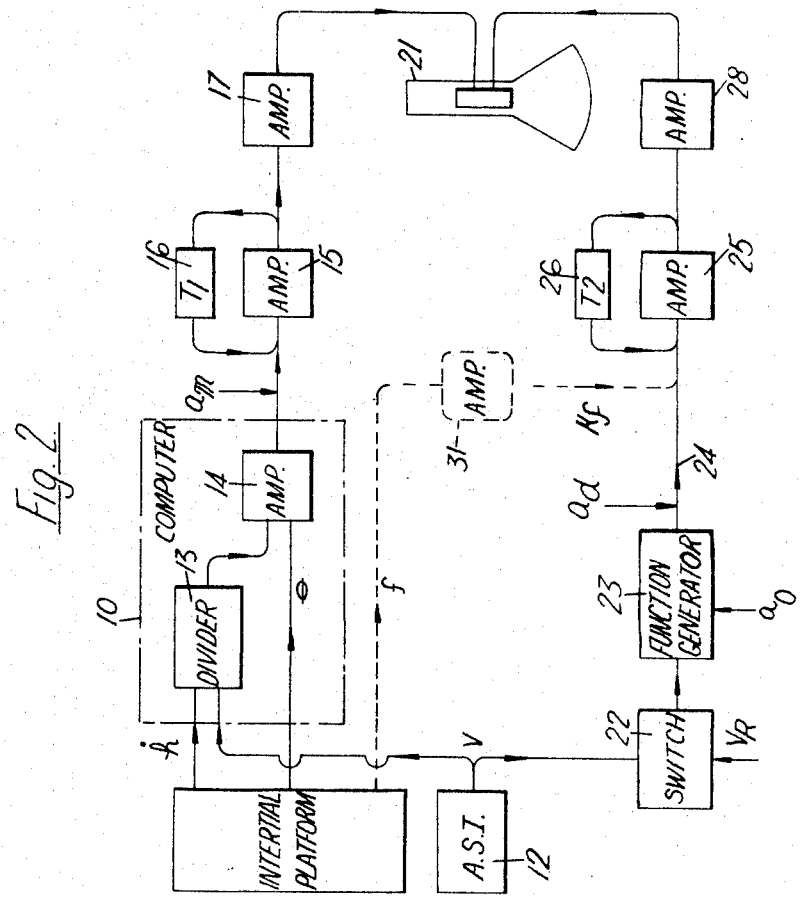

United States Patent Office 3,473,007
Patented Oct. 14, 1969

3,473,007
AIRCRAFT NAVIGATIONAL EQUIPMENT
Eric George Seacy and Francis Brian Whitehall, Edinburgh, Scotland, assignors to Ferranti, Limited, Hollinwood, Lancashire, England, a company of Great Britain and Northern Ireland
Filed Mar. 16, 1966, Ser. No. 534,795
Claims priority, application Great Britain, Mar. 19, 1965, 11,707/65
Int. Cl. G06f *15/50;* G06g *7/78*
U.S. Cl. 235—150.22                                    9 Claims

ABSTRACT OF THE DISCLOSURE

An aircraft take-off director which uses as a control parameter the actual angle-of-attack as continuously derived by an analogue computer. The angle thus measured is represented by a CRT display. A second display is simultaneously represented on the CRT and corresponds to an optimum angle-of-attack preset to suit the craft concerned. By comparing the two displays and flying the craft such that the two displays are in registration, the correct course for the craft concerned is followed.

---

Take-off directors which use the angle of attack as a parameter can derive such information direct from a probe-type sensor, but this information is liable to be rendered inaccurate by the proximity of the ground. More accurate devices derive that angle by calculating the lift force available at each instant from a knowledge of the aircraft's weight and loading and its speed at that instant. These posses the disadvantage that as the weights are not constant, they have to be estimated for each flight.

An object of the invention is accordingly to provide a take-off director which measures the angle of attack by more direct methods not requiring a knowledge of the aircraft's weight and loading.

A further object is to provide such a director which presents to the pilot during the take-off a display that directs him to apply an angle of attack such that the lift-off and subsequent climb may be accomplished under optimum conditions.

Another object is to provide such a director the accuracy of which is not aprpeciably reduced because of the proximity of the ground during the take-off.

In accordance with the present invention, a take-off director for an aircraft includes means for continuously deriving the true airspeed V, inertial equipment for continuously deriving the vertical velocity $dh/dt$, where $h$ is the height from the grounds, and the pitch angle $\theta$, an electrical analogue computer for continuously deriving the actual angle of attack $a_m$ from the solution of the equation $$a_m = \theta - (dh/dt)/V$$

means for supplying this computer with inputs corresponding to the quantities $\theta$, $dh/dt$, and V, and a stage for smoothing the quantity $a_m$ thus derived.

Means arranged to be initiated when V has a predetermined value $V_R$ may be provided to generate continuously a computed quantity $a_d$ to represent at any given moment the angle of attack appropriate to the optimum flight conditions at that moment, and display means for continuously comparing the smoothed quantity $a_m$ with a quantity dependent on the computed quantity $a_d$.

Figure 1:
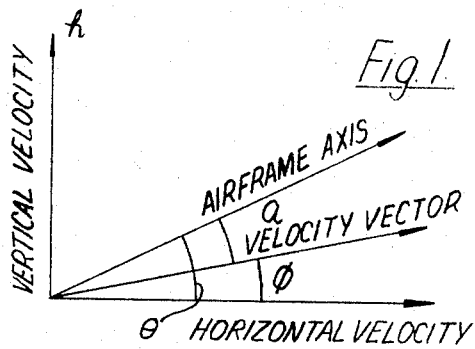
Figure 3:
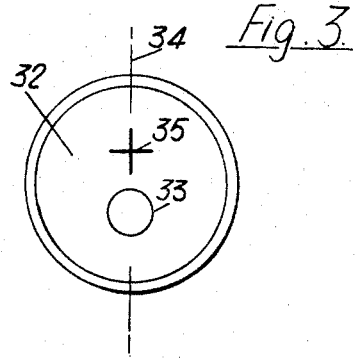
Figure 4:
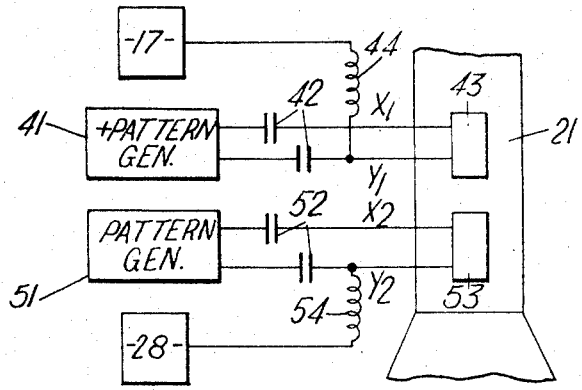

In the accomanying drawings,

FIGURE 1 is a velocity vector diagram to assist in explaining the principle of the invention, FIGURE 2 is a schematic diagram of one embodiment of the invention, FIGURE 3 shows a display of the kind provided by the equipment of FIGURE 2, and FIGURE 4 shows a part of FIGURE 2 with arrangements for generating the display of FIGURE 3.

The invention overcomes the difficulty of measuring the angle of attack $a$, between the velocity vector and the airframe axis, in the proximity of the ground by measuring instead the pitch angle $\theta$ (see FIG. 1) between the horizontal and the airframe axis by inertial methods and obtaining $a$ by subtracting from $\theta$ the angle $\varphi$ between the horizontal and the velocity vector; it will be seen from the vector diagram that sin $\varphi$ is the ratio of the vertical velocity to the velocity V, and hence at the low values of $\varphi$ appropriate to this stage of the take-off we get:

$$dh/dt = V \sin \varphi = \varphi V \varphi \text{ approx.}$$

Hence
$$a = \theta - (dh/dt)/V \tag{1}$$

The inertial equipment for measuring $\theta$ may be a vertical gyro provided for that purpose; or the measurement may be derived from an inertial platform provided primarily for other navigational purposes; the vertical velocity may also be derived from this platform—for example, by intergrating the output of an accelerometer responsive to acceleration in the vertical direction. As another alternative, the vertical velocity may be derived by integrating the output resolved in the vertical direction of an accelerometer mounted on the airframe. The quantity V may be derived from the airspeed indicator and corrected for relative density.

A take-off director in accordance with the invention is thus able to present the pilot with a measured value of his angle of attack throughout the lift-off and subsequent climb. The only external sensor required is the airspeed indicator.

An embodiment of the invention making use of this principle will now be described by way of example with reference to FIGS. 2 and 3.

An electrical analogue computer 10 is supplied with a signal proportional to the vertical velocity $dh/dt$, obtained from an intertial platform 11, with a signal proportional to the airspeed V obtained from an airspeed indicator (ASI) 12, with appropriate correction for air density. In a dividing stage 13, the computer divides the vertical velocity signal by the airspeed signal and so obtains the second term on the right-hand side of Equation 1. An amplifier 14 receives from the platform a signal proportional to the pitch angle $\theta$ and subtracts from it the output from the divider 13, thereby continually deriving a signal proportional to the measured value $a_m$ of the attack angle.

The quantity $a_m$ thus derived by the computer is smoothed by an amplifier 15 provided with negative feedback through a network 16 having a time-constant $T_1$. After amplification in a stage 17 this signal is applied to the deflection system of a cathode-ray (CR) tube 21, to provide a display of a kind to be described later.

For comparison with this signal representing the smoothed measured value of the angle of attack, a signal proportional to a computed quantity $a_d$ of that angle, which might be termed the demand signal, is derived to represent at any given moment the angle of attack appropriate to the optimum flight conditions at that moment. For this purpose the director includes a switching stage 22 to which is applied a signal from the airspeed indicator 12 to represent the actual value of the airspeed V together with a signal preset by hand to represent the critical value $V_R$ of the airspeed at which the craft should be rotated into its climb. The stage is arranged so that when the actual airspeed V reaches the preset value $V_R$, a signal is applied to initiate the generation in a function-generator or sweep generator stage 23 of a voltage representing the quantity $a_d$, varied at a fixed rate which has been predetermined for the type of aircraft concerned, starting from a manually preset value $a_0$. From that value the voltage increases linearly with time until a predetermined maximum value is reached beyond which the pilot need not be assisted further.

The output on lead 24 from generator 23 is smoothed by an amplifier 25 having negative feedback through a network 26 of time-constant $T_2$. The output from this amplifier is applied through a buffer amplifier 28 to the deflection system of CR tube 21.

For a reason to be explained later, there may be combined with the demand signal from stage 23 a signal proportional to the horizontal acceleration $f$ which is derived from the initial platform and after amplification of a value $kf$ by a stage 31 is combined in an additive sense in amplifier 25 with the output from generator 23.

The type of display provided by tube 21 is such that the measured signal from the computer is displayed on the tube screen 32 (see FIG. 3) in the form of a circle, as shown at 33, on the vertical centre line 34 of the screen at a height on it dependent on the signal from amplifier 17, whereas the demand signal from stage 23 is displayed in the form of a cross 35, also on the centre-line 34, at a height on it which, if the acceleration signal is added as described, is dependent on the signal from amplifier 28 modified by the signal proportional to the acceleration $f$.

In operation, the quantities $V_R$ and $a_0$ are preset in stages 22 and 23 before the take-off begins, stage 23 having already been adjusted to suit the particular type of aircraft. During the actual lift-off the pilot so manoeuvres his craft as to keep the two displays 33 and 35 in registration throughout, thereby causing the aircraft to climb upwards at a steadily increasing angle of attack. By doing so he automatically applies an angle of attack such that the rotation, lift-off, and subsequent climb are accomplished under optimum conditions, as defined by the rate and starting valve preset in generator 23, until the preset maximum is reached. At this point the output signed from stage 23 may be discontinued, or it may be continued to guide the craft into level flight at a desired height.

As the pilot's task is to make the measured angle equal to the demanded angle, and so to adjust the position of the circle rather than that of the cross, the feedback networks 16 and 26 are designed so that the time-constant $T_1$ is somewhat shorter than $T_2$.

The introduction of the term $kf$ proportional to the horizontal acceleration has the effect of damping out the slow oscillations in height, likely to accompany the mode of flight which is characterised by periodic fluctuations in speed, which would tend to occur if the demand display were only in accordance with angle-of-attack information.

Where the tube is of the double-beam type, suitable arrangements for generating the two displays 33 and 35 of FIG. 3 may be as shown in FIG. 4.

A deflection signal which sets up a cruciform pattern of beam displacement is generated in a stage 41 and applied by way of capacitors 42 and leads $X_1$ and $Y_1$ to a first set 43 of orthogonal deflecting electrodes. The signal from stage 17 is injected into the $Y_1$ lead by way of an inductor 44 to as to control the vertical position of the cruciform display 35 on the screen 32 of the tube.

Similarly a deflection signal which sets up a circular pattern is generated in a stage 51 and applied by way of capacitors 52 and leads $X_2$ and $Y_2$ to a second set of orthogonal deflection electrodes 53, with the signal from stage 28 injected into lead $Y_2$ by way of an inductor 54 to control the vertical position of the circular display 33.

In an alternative and simpler form of display not shown, which may be provided by an instrument of the pointer type, the smoothed quantities $a_m$ and $a_d$ are compared with one aonther direct.

A take-off director in accordance with the invention thus has the advantage over devices that measure the angle of attack direct of not having its accuracy disturbed by the proximity of the ground, and over devices depending on the weight and load of not requiring estimates of those variables to be made in advance of each flight. It will be appreciated that the signal applied to the function generator 23 has only to be derived once that is, the sweep of generator 23 is preset, for the particular type of craft concerned, and not for each flight.

What we claim is:
1. A take-off director for an aircraft including
   (a) means for continuously deriving a signal corresponding to the true airspeed V of the aircraft,
   (b) inertial equipment for continuously deriving a first signal corresponding to the vertical velocity $dh/dt$ of the aircraft, where $h$ is the height of the aircraft from the ground, and a second signal corresponding to the pitch angle $\theta$,
   (c) an electrical analogue computer to receive the derived signals for continuously deriving an output signal $a_m$ representative of the actual angle of attack of the aircraft,
   (d) means for supplying said computer with said derived signals,
   (e) a stage connected to receive said output signal $a_m$ for smoothing the quantity of $a_m$ thus derived,
   (f) means to be initiated when V has a predetermined value $V_R$ for generating a demand signal $a_d$ which represents at any given moment the angle of attack appropriate to the optimum flight conditions at that moment,
   (g) and display means for continuously comparing the smoothed quantity $a_m$ with a quantity dependent on the demand signal $a_d$.

2. Apparatus as claimed in claim 1 including a stage for smoothing the quantity $a_d$, thereby providing the said quantity dependent on $a_d$.

3. Apparatus as claimed in claim 2 wherein the stage for smoothing the quantities $a_m$ and $a_d$ have comparatively shorter and longer time constancy respectively.

4. Apparatus as claimed in claim 1 wherein the inertial equipment further derives a third signal proportional to the horizontal acceleration of the aircraft and the demand signal on $a_d$ is modified by the addition to it of said signal proportional to the horizontal acceleration of the aircraft.

5. Apparatus as claimed in claim 1 wherein the display means includes a cathode-ray tube with arrangements for displaying the smooth quantity $a_m$ with the quantity dependent on the computed quantity $a_d$ in such manner that by flying the aircraft so as to keep these displays in registeration the pilot ensures that the take-off is effected in accordance with the demand signal.

6. Apparatus as claimed in claim 1 wherein said analogue computer derives said output signal from the solution of the equation $$a_m = \theta - (dh/dt)/V$$

7. Apparatus as claimed in claim 6 wherein said analogue computer includes a first stage connected to receive said signal corresponding to the true airspeed V and said signal corresponding to vertical velocity, said stage being operative to divide the vertical velocity signal by the airspeed signal to thereby provide a quotient output signal, a second stage connected to receive said quotient output signal and said signal corresponding to the pitch angle $\theta$ and being operatively arranged to subtract from the pitch angle signal the quotient output signal from the first stage to thereby continuously derive the signal $a_m$ proportional to the attack angle of the aircraft.

8. A take-off director for an aircraft comprising an electrical analogue computer for continuously deriving in response to the continuous application of a plurality of input signals an output signal proportional to the angle of attack of the aircraft, said input signals including a first quantity proportional to the vertical velocity of the aircraft, a second quantity proportional to the true airspeed of the aircraft and a third quantity proportional to the pitch of the aircraft, a generator adapted to be initiated to generate a demand signal when the true airspeed of the aircraft is at a predetermined value, said demand signal corresponding to any given moment to the angle of attack appropriate to the optimum flight conditions at that moment, display means for simultaneously presenting a continous visual comparison of the true angle of attack of the aircraft to the angle of attack appropriate to the optimum flight conditions at the moment and means for operatively applying said output signal and said demand signal to said display means to effect said visual presentation.

9. Apparatus as claimed in claim 8 wherein said generator is a sweep generator having an output which increases linearly with time, said output corrresponding to the demand signal.

References Cited

UNITED STATES PATENTS

| | | | |
|---|---|---|---|
| 3,100,612 | 8/1963 | Owen | 244—77 |
| 3,241,792 | 3/1966 | Hattendorf | 244—77 |
| 3,262,311 | 7/1966 | Gwanthmey | 73—178 |

MALCOLM A. MORRISON, Primary Examiner

ROBERT W. WEIG, Assistant Examiner

U.S. Cl. X.R.

73—178

PO-1050
(5/69)

UNITED STATES PATENT OFFICE
CERTIFICATE OF CORRECTION

Patent No. 3,473,007          Dated October 14, 1969

Inventor(s) Eric George Seacy and Francis Brian Whitehall

It is certified that error appears in the above-identified patent and that said Letters Patent are hereby corrected as shown below:

Column 1, lines 16-17 "de-drived" should read --de-rived--; line 33, "posses" should read --possess--. Column 2, line 15, "$\varphi V \varphi$ approx." should read --$V\varphi$ approx.--. Column 3, line 41, "signed" should read --signal; line 72, after "display" insert a comma. Column 4, line 45, cancel "on". Column 5, line 8, "to", first occurrence, should read --at--. Column 6, line 11, "Gwanthmey" should read --Gwathmey--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents